United States Patent [19]

Craig

[11] Patent Number: 5,261,952
[45] Date of Patent: Nov. 16, 1993

[54] SOLID MARKING COMPOSITION CONTAINING GLITTER

[75] Inventor: Michael S. Craig, Easton, Pa.

[73] Assignee: Binney & Smith Inc., Easton, Pa.

[21] Appl. No.: 968,843

[22] Filed: Oct. 30, 1992

Related U.S. Application Data

[63] Continuation-in-part of Ser. No. 860,973, Mar. 31, 1992, abandoned.

[51] Int. Cl.$^5$ .............................................. C09D 13/00
[52] U.S. Cl. ................................. 106/19 B; 106/19 R
[58] Field of Search ........................... 106/19 R, 19 B

[56] References Cited

U.S. PATENT DOCUMENTS

| | | | |
|---|---|---|---|
| 2,623,827 | 12/1952 | Moos | 106/23 |
| 2,835,604 | 5/1958 | Aronberg | 106/243 |
| 3,409,574 | 11/1968 | Gros | 106/19 |
| 3,627,546 | 12/1971 | Coppeta | 106/19 |
| 3,672,842 | 6/1972 | Florin | 23/230 R |
| 3,933,708 | 1/1976 | Brinkman | 523/164 |
| 3,981,730 | 9/1976 | Takahashi et al. | 96/49 |
| 3,993,492 | 11/1976 | Woolly | 106/19 |
| 4,212,676 | 7/1980 | Ueda | 106/19 |
| 4,233,077 | 11/1980 | Hazel | 106/43 |
| 4,419,070 | 12/1983 | Gustafson | 431/126 |
| 4,484,952 | 11/1984 | Bes et al. | 106/504 |
| 4,525,214 | 6/1985 | Panken | 106/19 |
| 4,525,425 | 6/1985 | Church | 428/428 |
| 4,606,914 | 8/1986 | Miyoshi | 424/63 |
| 4,768,987 | 9/1988 | Usui et al. | 106/19 |
| 4,840,669 | 6/1989 | Hughes et al. | 106/19 |
| 4,937,274 | 6/1990 | Arima et al. | 523/220 |
| 4,978,390 | 12/1990 | Snedeker | 106/19 |
| 4,990,013 | 2/1991 | Hejmanowski | 106/19 |
| 5,055,498 | 10/1991 | Brachman | 523/164 |

FOREIGN PATENT DOCUMENTS 54-086524 7/1979 Japan .

OTHER PUBLICATIONS

Carey, "Metallic Flake Pigments: Brilliant Additions to Paint," *Modern Paint & Coatings*, Aug. 1990, pp. 56, 57, 60, 62.
Encyclopedia of Chemical Technology, *Pigments*, vol. 17, pp. 788–889 (Kirk-Othmer 3d Ed.).
Chicago Tribune, "New Crayons Sport the High-Tech Look," Chicago Tribune, Sunday, Feb. 17, 1991.
Chem Abstract, vol. 94, Abstr. No. 105015, 1980.
Chem Abstract, vol. 99, Abstr. No. 176903, 1983.
Derwent Abstract WPI 79-62033B/34, Abstract of JP 82-009759B, Nov. 1982.

*Primary Examiner*—Mark L. Bell
*Assistant Examiner*—Scott L. Hertzog
*Attorney, Agent, or Firm*—Leydig, Voit & Mayer

[57] ABSTRACT

A solid marking composition comprising a waxy material, particularly a plasticizer and a fatty acid, an emollient, a pigment, and glitter, which is suitable for use in writing instruments, such as crayons, and may be applied to porous and non-porous substrates such that the glitter is retained in the marking composition on the marked surface.

20 Claims, No Drawings

SOLID MARKING COMPOSITION CONTAINING GLITTER

This patent application is a continuation-in-part of copending U.S. patent application Ser. No. 07/860,973, filed Mar. 31, 1992, now abandoned.

TECHNICAL FIELD OF THE INVENTION

The present invention relates to a solid marking composition and to a writing instrument fabricated from such a solid marking composition. In particular, this invention relates to a solid marking composition that comprises glitter and to crayons fabricated from such a solid marking composition.

BACKGROUND OF THE INVENTION

It is well known in the art that solid marking compositions can be formulated from mixtures of waxes, fatty acids, colorants, and color extenders. These solid marking compositions can be used to fabricate crayons, which can be used to draw, write, or color on porous and non-porous substrates. Crayons are most often used on various types of paper, such as notebook paper, art paper, and posterboard. Furthermore, crayons are available in a wide selection of colors, ranging from primary colors to fluorescent colors.

Attempts have been made to combine glitter with conventional crayons in order to produce a glitter crayon which yields a glitter effect on substrates during the normal use of a crayon to impart color to a substrate. U.S. Pat. No. 4,840,669 discloses a water-soluble crayon composition consisting of water-soluble wax such as microcrystalline wax, polymeric thickener such as polyacrylic acid, color, and glitter. U.S. Pat. No. 4,990,013 discloses a crayon composition comprising a base wax binder such as the combination of paraffin, candelilla, and carnauba waxes, an emulsifying agent such as stearic acid, and reflective flake.

The attempts to prepare a glitter crayon, however, have not as yet been successful, and the prior art does not teach a solid marking composition which can impart glitter to a surface in as easy a manner as the surface may be colored. There has been marketed a metal-swirl version of a Crayola® crayon which contains fine particles of aluminum; however, while this type of crayon yields a swirl effect and alters the typical pigment, such a crayon does not impart a glitter effect to a substrate. Thus, there remains a need for a solid marking composition to impart glitter to a substrate during normal coloring of the substrate with the solid marking composition.

It is an object of the present invention to provide such a solid marking composition which imparts glitter to a surface upon coloring the surface with the solid marking composition. It is another object of the present invention to provide a solid marking composition containing glitter that is suitable for use on porous and nonporous substrates and that can be used to substantially fix the glitter on a marked substrate indefinitely. It is a further object of the present invention to provide a solid marking composition containing glitter which may be easily removed from a nonporous marked substrate, e.g., through the use of mild soap and water. It is still another object of the present invention to provide a solid marking composition suitable for use in writing instruments such as crayons.

These and other objects and advantages of the present invention, as well as additional inventive features, will become apparent from the description of the present invention provided herein.

BRIEF SUMMARY OF THE INVENTION

The present invention pertains to a solid marking composition that comprises a waxy material, such as a fatty acid in combination with a plasticizer, an emollient, a pigment, and glitter. The composition may additionally comprise other components such as fillers, processing aids, cleanability agents, and the like. The composition is formulated such that the glitter is capable of being retained on a substrate when the composition is deposited on the substrate through the normal activity of marking the substrate with the composition.

The solid marking composition may be applied to porous and non-porous substrates, and, in the absence of an effort to remove the composition, the composition with the glitter is retained on marked surfaces indefinitely. The addition of a cleanability additive to the composition enables the solid marking composition to be easily removed from non-porous substrates, if so desired.

The solid marking composition is suitable for use in writing instruments. In particular, the composition is especially suitable for use in crayons.

DETAILED DESCRIPTION OF THE PREFERRED EMBODIMENTS

The solid marking composition of the present invention comprises a waxy material, particularly a plasticizer and a fatty acid, an emollient, a pigment, and glitter, such that the glitter is capable of being retained on a substrate when the composition is, deposited on the substrate. The present inventive composition is particularly well-suited for use in preparing glitter crayons.

The waxy material is any material with sufficient hardness to be handled, yet soft enough that abrasion of the material at reasonable pressure against a substrate such as paper will result in the material adhering to the substrate Solid marking compositions for crayons generally utilize one of three primary waxy materials Traditional crayons are based on paraffin wax and stearic acid. Plastic crayons use polyethylene resin and a plasticizer, and water-soluble crayons utilize water-soluble polyethylene glycol resins The waxy material in the context of the present invention may be a single compound, but will more likely be a mixture of compounds which in combination provide the desired properties of the marking composition. The preferred waxy material for use in the context of the present invention is the combination of a plasticizer and a fatty acid. The waxy material may be present in any suitable amount, preferably from about 40% to about 80% by weight of the total marking composition and most preferably in an amount from about 60% to about 75% by weight of the total marking composition. The preferred waxy material of mixture of a plasticizer and a fatty acid may have any suitable weight ratio of those two components. The preferred weight ratio of plasticizer:fatty acid is 50:50 to about 80:20 and most preferably about 60:40 to about 70:30.

The plasticizer may be any suitable material and will generally comprise one or more paraffin waxes, microcrystalline waxes, synthetic waxes, natural waxes, vegetable fats and hydrogenated and sulfonated derivatives thereof, animal fats and hydrogenated derivatives thereof, fatty esters of glycols, fatty acid salts of alkali and alkaline earth metals and aluminum, and mixtures thereof. The plasticizer is preferably one that has a melting point in the range of about 52° C. (125° F.) to about 82° C. (180° F.), most preferably in the range of about 52° C. (125° F.) to about 68° C. (155° F.). A paraffin wax is most preferred as the plasticizer, particularly in combination with microcrystalline wax, such as in a weight ratio of paraffin wax:microcrystalline wax of about 95:5 to about 80:20. The addition of small quantities of microcrystalline wax aids in the processing of the solid marking composition, as well as the laydown and glitter adhesion properties of the solid marking composition.

The plasticizer may be present in any suitable amount, preferably in an amount from about 20% to about 65% by weight of the total marking composition and more preferably in an amount from about 35% to about 45% by weight of the total marking composition. When the plasticizer is a mixture of paraffin and microcrystalline waxes, then the paraffin wax is preferably present in an amount from about 30% to about 40% by weight of the total marking composition, while the microcrystalline wax is preferably present in an amount from about 1% to about 5% by weight of the total marking composition.

The fatty acid may be a saturated fatty acid, an unsaturated fatty acid, or a mixture of fatty acids. It is preferred that the fatty acid is one that adds strength to the composition and has from about 12 to about 24 carbon atoms, preferably about 14 to about 18 carbon atoms. Suitable fatty acids include lauric acid, myristic acid, palmitic acid, stearic acid, and mixtures thereof. The fatty acid is preferably stearic acid alone or a mixture of palmitic and stearic acids, particularly in a 55:45 weight ratio. Stearic acid is the most preferable fatty acid in the context of the present invention.

The fatty acid may be present in any suitable amount, preferably in an amount from about 5% to about 40% by weight of the total marking composition and most preferably in an amount from about 20% to about 30% by weight of the total marking composition.

The emollient is designed to enable the solid marking composition to more readily and easily be imparted to a substrate through normal application of the solid marking composition to the substrate. The emollient thereby provides a lubricant effect or slipperiness to the solid marking composition to facilitate the gliding of the solid marking composition across the surface of a substrate and to ensure a smooth laydown of the solid marking composition onto the substrate. The emollient also assists in ensuring the retention of the glitter in the solid marking composition imparted to the substrate. As such, the emollient will typically be a liquid or paste at room io temperature and is preferably miscible in the waxy material such as the combination of a plasticizer, e.g., paraffin wax, and a fatty acid, e.g., stearic acid. Any suitable emollient may be used in the present inventive solid marking composition, such as lanolin oil and its derivatives, mineral oil, fatty esters, fatty acid esters, fatty alcohols, mono- and di-esters of propylene glycols, glycerol di-esters, mono- and di-esters of polyethylene glycols, petrolatum, vegetable shortenings, dimers and trimers of fatty acids, plant oils, silicones, and mixtures thereof.

Suitable lanolin derivatives include acetylated lanolin, acetylated lanolin alcohol, hydrogenated lanolin, lanolin alcohol, lanolin acids, isopropyl lanolate, lanolin wax, and hydroxylated lanolin. Suitable fatty esters and fatty acid esters include isopropyl myristate, myristyl myristate, and esterified fatty acid propoxylates such as polyoxypropylene (2) myristyl ether propionate. Suitable fatty alcohols include oleyl alcohol, and suitable vegetable shortenings include Kremit ® (Armour, Omaha, Nebraska). Suitable plant oils include castor oil, coconut oil, olive oil, peanut oil, safflower oil, sesame oil, soybean oil, wheat germ oil, corn oil, avocado oil, almond oil, grape seed oil, jojoba oil, apricot kernel oil, palm oil, and sunflower seed oil. Suitable silicones include Dow-Corning ® 556, 593, and 1107 fluids (Dow-Corning, Midland, Michigan). Other possible emollients include longer chain hydrocarbons, particularly alkenes, such as polyoxypropylene-polyoxyethylene block copolymers such as Pluronic ® 25R4 and Pluronic ® 25R8 (BASF, Parsippany, New Jersey).

The emollient is preferably selected from the group consisting of lanolin oil and its derivatives, mineral oil, plant oils, and mixtures thereof. Lanolin oil is the most preferred emollient in the context of the present invention; however, mineral oil is also a very good emollient and less expensive than lanolin oil. While the use of lanolin oil alone as the emollient is preferred, lanolin oil may be used in combination with mineral oil or another emollient, such as polyoxypropylene (2) myristyl ether propionate which provides enhanced laydown properties in combination with lanolin oil.

The emollient may be present in any suitable amount, preferably in an amount from about 3% to about 20% by weight of the total marking composition and most preferably in an amount from about 5% to about 10% by weight of the total marking composition.

The solid marking composition is preferably pigmented. The pigment may be an inorganic pigment, an organic pigment, or a mixture thereof. The inorganic pigment is preferably iron blue, iron oxide, zinc oxide, ultramarine blue, titanium dioxide, or a mixture thereof. The organic pigment is preferably an azo, a naphthol, or a phthalo pigment. Dyes, either acidic or basic, can also be used in the present inventive marking composition, although pigments are preferred over dyes.

The pigment preferably has a particle size in the range of about 0.1 micron to about 25 microns. More preferably, the pigment has a particle size in the range of about 0.3 micron to about 20 microns, and, most preferably, the pigment particle size is in the range of about 0.5 micron to about 15 microns.

The pigment may be present in any suitable amount. The present inventive marking composition preferably contains pigment in an amount from about 0.5% to about 15% by weight of the total marking composition, more preferably from about 2% to about 10% by weight of the total marking composition, and most preferably in an amount from about 3% to about 10% by weight of the total marking composition.

The glitter may be of any suitable material and will generally comprise a metallic material, a nonmetallic material, or, more commonly, a reflective material coating, such as a metal coating, on a suitable substrate such as a polymer or other solid organic substrate. Suitable metallic glitters include particles or flakes of aluminum, copper, silver, gold, brass, or other metals. Suitable non-metallic glitters include particles or flakes of cellulose acetate, poly(ethylene terephthalate), polymethacrylate, poly(vinylbutyral), and the like. Suitable metallized glitters include coated metallized materials such as coated aluminum metallized cellulose acetate, poly(ethylene terephthalate), polymethacrylate, poly(vinylbutyral), and the like. Coated aluminum metallized poly(ethylene terephthalate) is the preferred glitter for use in the context of the present invention.

The glitter may be any color (e.g., silver, gold, blue, red, etc.) or even a mixture of colors. If pigment is present in the solid marking composition, the glitter may be the same color as the pigment or a different color from the pigment.

The glitter also may be of any dimensions that are suitable for use in such a composition. The glitter is preferably less than about $0.05 \times 0.05 \times 0.005$ cm ($0.02 \times 0.02 \times 0.002$ inches) in size, more preferably less than about $0.03 \times 0.03 \times 0.003$ cm ($0.01 \times 0.01 \times 0.001$ inches) in size, and most preferably about $0.02 \times 0.02 \times 0.003$ cm ($0.008 \times 0.008 \times 0.001$ inches) to about $0.02 \times 0.02 \times 0.001$ cm ($0.008 \times 0.008 \times 0.0005$ inches), or even about $0.01 \times 0.01 \times 0.001$ cm ($0.004 \times 0.004 \times 0.005$ inches) or less, in size, although glitter which is too small in size may not exhibit a desirable glitter effect.

The glitter may be present in any suitable amount, preferably less than about 15% by weight of the total marking composition, more preferably in an amount from about 3% to about 10% by weight of the total marking composition, and most preferably in an amount from about 4% to about 8% by weight of the total marking composition.

Since the components of the present inventive marking composition are preferably combined and mixed in semisolid or liquid form at elevated temperature, it is most preferred that the glitter not produce irritating fumes at elevated temperatures, e.g., up to 110°-121° C. (230°-250° F.), although such fumes do not adversely affect the performance of the solid marking composition of the present invention.

The solid marking composition may additionally include filler. The filler preferably functions as a pigment dispersant or extender, if pigment is added to the marking composition. Any suitable filler may be utilized, such as calcium carbonate, talc, silica, clay (e.g., kaolin clay), feldspar, corn starch, mica, and mixtures thereof. The most preferred fillers are talc and kaolin clay. The particle size of the filler is preferably 50 microns or less, most preferably 25 microns or less, although if mica is used, the particle size is preferably about 25-75 microns. Talc of about 3-6 microns average diameter particle size is most preferred for use in the present invention.

The filler may be present in any suitable amount, preferably in an amount up to about 25% by weight of the total marking composition, more preferably in an amount of about 10% to about 20% by weight of the total marking composition, and most preferably in an amount from about 10% to about 15% by weight of the total marking composition.

A cleanability additive is also preferably added to the solid marking composition to aid in the removal of the composition, preferably with mild soap and water, from non-porous surfaces, such as table tops, counter tops, etc. Suitable cleanability additives include polyoxypropylene-polyoxyethylene block copolymers, polyoxyethylene alcohols, polyoxyethylene esters, polyoxyethylene ethers, and derivatives and mixtures thereof. The solid marking composition preferably contains a cleanability agent such as polyoxyethylene (12) tridecyl ether or alcohol, polyoxyethylene (10) alkyl aryl ether, polyoxyethylene (40) stearate, or polyoxyethylene (20) stearyl alcohol. The solid marking composition more preferably contains polyoxyethylene (40) stearate (available as Lipopeg® 39S (Lipo Chemicals, Patterson, New Jersey)) or polyoxyethylene o 20 (12) tridecyl ether alcohol (available as Renex® 30 (ICI America, Wilmington, Delaware)), most preferably a mixture of the two. Certain emollients may also act as cleanability additives or aid in cleanability, such as polyoxypropylene-polyoxyethylene block copolymers, e.g., Pluronic® 25R4 or 25R8.

The cleanability additive may be present in any suitable amount, preferably in an amount up to about 5% by weight of the total marking composition, more preferably in an amount from about 1% to about 4% by weight of the total marking composition, and most preferably in an amount from about 1% to about 3% by weight of the total marking composition.

Other additives may be also incorporated into the marking composition of the present invention, including, for example, processing aids such as foam inhibitors and mold release agents, as well as oxidation and UV stabilizers. Suitable foam inhibitors include petroleum hydrocarbons such as Foamkill® 614 (Crucible Chemical Co., Greenville, South Carolina). Suitable mold release agents include the Group IIA metal salts of fatty acids, particularly calcium stearate. Suitable oxidation stabilizers include sterically hindered phenols. Suitable UV stabilizers include hindered amine light stabilizers and benzotriazoles.

The solid marking composition of the present invention may be prepared in any appropriate manner. The components are preferably heated to a semisolid, or more preferably, liquid state and mixed together. Generally, a portion of the waxy material, e.g., plasticizer and fatty acid, is heated above its melting temperature, e.g., to about 104°-116° C. (220°-240° F.). Then, the remainder of the waxy material in combination with the glitter is added to the liquified waxy material, while stirring the composition with suitable stirring means, such as, for example, a disperser head mixer. The filler and pigment are then added in sequence to the composition after the waxy material and glitter combination have melted under continued stirring of the composition. The emollient, along with any other additives such as cleanability agents and the like, are added to the liquified waxy material, while continuing to stir the composition. The composition is then appropriately molded, such as by pouring the composition into flatbed molds and cooling the composition into suitable forms using conventional techniques.

The solid marking composition of the present invention is hard enough to handle, yet soft enough to allow for the laydown of the composition on a substrate in the course of the normal marking of a substrate with the composition. In that respect, the solid marking composition preferably has a hardness defined by a needle penetration value of about 25 to about 45 mm, more preferably about 30 to about 40 mm, as determined by a test method similar to ASTM Standard Test Method D 1321-85 ("Needle Penetration of Petroleum Waxes"). Specifically, the needle penetration values set forth herein were determined by using an ASTM Specification D-5-52 Serial No. L-285 penetration needle and a weight of 278 grams. The solid marking composition is formed into a crayon by conventional techniques and placed in a cradle on the penetrometer table. The crayon temperature is maintained at $22 \pm 1°$ C. ($72 \pm 1°$ F.). The table of the penetrometer is adjusted to enable accurate placement of the tip of the needle on the level surface of the crayon while maintaining a zero reading on the indicator. A weight of 278 grams is placed on the collar of the shaft and the needle shaft is smoothly released. The needle is allowed to drop for 5.0±0.1 seconds and then stopped. The indicator shaft of the penetrometer is depressed until stopped by the needle shaft, and the penetration of the needle is read from the indicator dial. This procedure is repeated three or four times, with needle locations approximately 1.27 cm (0.5 inches) apart, and the average needle penetration value is reported as the needle penetration value for the solid marking composition.

The solid marking composition of the present invention is suitable for use in writing instruments, in particular, crayons, and may be applied to a variety of porous and non-porous writing surfaces or substrates. The solid marking composition is such that, upon application of the solid marking composition to a surface (e.g., using the solid marking composition to mark or color a substrate), the glitter is retained in the marking composition on the marked surface.

The following examples serve to further illustrate the present invention and are not intended to limit the scope of the invention.

EXAMPLE 1

Preferred embodiments of the solid marking composition for use in crayons may be prepared as follows, with all percentages being weight percentages based on the total weight of the solid marking composition.

| Component | Preferred Range | Optimal Range |
|---|---|---|
| paraffin wax | 20–60% | 30–40% |
| microcrystalline wax | 0–10% | 1–5% |
| stearic acid | 5–40% | 20–30% |
| lanolin oil | 3–20% | 5–10% |
| Lipopeg ® 39S | 0–5% | 1–5% |
| Renex ® 30 | 0–5% | 1–5% |
| Foamkill ® 614 | 0–3% | 0.5–2% |
| pigment | 2–15% | 3–8% |
| talc (3.3 μm ave. diameter) | 0–25% | 10–20% |
| coated aluminum metallized poly(ethylene terephthalate) glitter | 1–15% | 5–10% |

EXAMPLE 2

Other preferred embodiments of the solid marking composition for use in crayons may be prepared as follows, with all percentages being weight percentages based on the total weight of the solid marking composition.

| Component | Preferred Range | Optimal Range |
|---|---|---|
| stearic:palmitic acid mixture (55:45 weight ratio) | 5–40% | 20–25% |
| paraffin wax | 20–65% | 40–45% |
| lanolin oil | 3–9% | 5–7% |
| polyoxypropylene (2) myristyl ether propionate | 0.5–2% | 1–2% |
| Pluronic ® 25R8 | 1–5% | 2–4% |
| pigment | 0.5–15% | 3–10% |
| talc (3.3 μm ave. diameter) | 0–25% | 10–15% |
| Renex ® 30 | 1–4% | 1–3% |
| coated aluminum metallized poly(ethylene terephthalate) glitter | 3–10% | 4–8% |

EXAMPLE 3

A crayon utilizing a solid marking composition that comprises glitter was prepared to approximately contain 22.4 wt. % of a 55:45 weight ratio mixture of stearic and palmitic acids, 41.7 wt. % paraffin wax, 6.4 wt. % lanolin oil, 2.7 wt. % Pluronic ® 25R8, 1.1 wt. % polyoxypropylene (2) myristyl ether propionate, 1.3 wt. % Renex ® 30, 4.7 wt. % pigment (blue), 13.3% talc (3.3 μm ave. diameter), and 6.4 wt. % coated aluminum metallized poly(ethylene terephthalate) silver glitter (0.02×0.02×0.001 cm or 0.008×0.008×0.0005 inches). The solid marking composition, upon application to ordinary notebook paper, demonstrated good, smooth laydown properties and retained the glitter in the marking composition on the marked surface.

EXAMPLE 4

A crayon utilizing a solid marking composition that comprises glitter was prepared to approximately contain 21.9 wt. % of a 55:45 weight ratio mixture of stearic and palmitic acids, 40.8 wt. % paraffin wax, 3.7 wt. % mineral oil, 1.6 wt. % lanolin oil, 3.7 wt. % Pluronic ® 25R4, 1.6 wt. % polyoxypropylene (2) myristyl ether propionate, 3.1 wt. % Renex ® 30, 4.4 wt. % pigment (red), 13.1 wt. % talc (5.5 μm ave. diameter), and 6.3 wt. % coated aluminum metallized poly(ethylene terephthalate) silver glitter (0.02×0.02×0.001 cm or 0.008×0.008×0.0005 inches). The solid marking composition, upon application to ordinary notebook paper, demonstrated good, smooth laydown properties and retained the glitter in the marking composition on the marked surface, although not quite as well as the formulation of Example 3.

EXAMPLE 5

A crayon utilizing a solid marking composition that comprises glitter was prepared to approximately contain 2.5 wt. % of a 55:45 weight ratio mixture of stearic and palmitic acids, 41.8 wt. % paraffin wax, 3.8 wt. % mineral oil, 1.6 wt. % lanolin oil, 1.6 wt. % polyoxypropylene (2) myristyl ether propionate, 4.3 wt. % Renex ® 30, 4.6 wt. % pigment (red), 13.4 wt. % talc (5.5 μm ave. diameter), and 6.4 wt. % coated aluminum metallized poly(ethylene terephthalate) silver glitter (0.02×0.02×0.00×00.1 cm or 0.008×0.008×0.0005 inches). The solid marking composition, upon application to ordinary notebook paper, demonstrated good, smooth laydown properties and retained the glitter in the marking composition on the marked surface, although not quite as well as the formulation of Example 3. The solid marking composition did not have as good cleanability characteristics as the formulation of Example 4.

EXAMPLE 6

A crayon utilizing a solid marking composition that comprises glitter was prepared to approximately contain 22.3 wt. % of a 55:45 weight ratio mixture of stearic and palmitic acids, 41.4 wt. % paraffin wax, 3.7 wt. % mineral oil, 3.7 wt. % Pluronic ® 25R4, 1.6 wt. % polyoxypropylene (2) myristyl ether propionate, 3.2 wt. % Renex ® 30, 4.5 wt. % pigment (red), 13.3 wt. % talc (5.5 μm ave. diameter), and 6.4 wt. % coated aluminum metallized poly(ethylene terephthalate) silver glitter (0.02×0.02×0.001 cm or 0.008×0.008×0.0005 inches). The solid marking composition, upon application to ordinary notebook paper, retained the glitter in the marking composition on the marked surface, but exhibited a decrease in laydown properties as compared to the formulations of Examples 3-5.

EXAMPLE 7

A crayon utilizing a solid marking composition that comprises glitter was prepared to approximately contain 22.3 wt. % of a 55:45 weight ratio mixture of stearic and palmitic acids, 41.4 wt. % paraffin wax, 8.0 wt. % lanolin oil, 4.2 wt. % Renex ® 30, 4.5 wt. % pigment (red), 13.3 wt. % talc (5.5 μm ave. diameter), and 6.4 wt. % coated aluminum metallized poly(ethylene terephthalate) silver glitter (0.02×0.02×0.001 cm or 0.008×0.008×0.0005 inches). The solid marking composition, upon application to ordinary notebook paper, demonstrated good, smooth laydown properties and retained the glitter in the marking composition on the marked surface. The solid marking composition did not have as good cleanability characteristics as some of the other formulations.

EXAMPLE 8

A crayon utilizing a solid marking composition that comprises glitter was prepared to approximately contain 22.5 wt. % of a 55:45 weight ratio mixture of stearic and palmitic acids, 41.8 wt. % paraffin wax, 3.8 wt. % lanolin oil, 3.8 wt. % Pluronic ® 25R4, 1.1 wt. % polyoxypropylene (2) myristyl ether propionate, 2.8 wt. % Renex ® 30, 4.6 wt. % pigment (red), 13.4 wt. % talc (5.5 μm ave. diameter), and 6.4 wt. % coated aluminum metallized poly(ethylene terephthalate) silver glitter (0.02×0.02×0.001 cm or 0.008×0.008×0.0005 inches). The solid marking composition, upon application to ordinary notebook paper, demonstrated good, smooth laydown properties and retained the glitter in the marking composition on the marked surface.

EXAMPLE 9

A crayon utilizing a solid marking composition that comprises glitter was prepared to approximately contain 22.3 wt. % of a 55:45 weight ratio mixture of stearic and palmitic acids, 41.4 wt. % paraffin Wax, 4.8 wt. % lanolin oil, 3.7 wt. % Pluronic ® 25R8, 1.1 wt. % polyoxypropylene (2) myristyl ether propionate, 2.7 wt. % Renex ® 30, 4.5 wt. % pigment (red), 13.3 wt. % talc (5.5 μm ave. diameter), and 6.4 wt. % coated aluminum metallized poly(ethylene terephthalate) silver glitter (0.02×0.02×0.001 cm or 0.008×0.008×0.0005 inches). The solid marking composition, upon application to ordinary notebook paper, demonstrated good, smooth laydown properties and retained the glitter in the marking composition on the marked surface.

EXAMPLE 10

A crayon utilizing a solid marking composition that comprises glitter was prepared to approximately contain 22.8 wt. % of a 55:45 weight ratio mixture of stearic and palmitic acids, 42.3 wt. % paraffin wax, 6.5 wt. % lanolin oil, wt. % polyoxypropylene (2) myristyl ether propionate, 2.7 wt. % Renex ® 30, 4.6 wt. % pigment (red), 13.6 wt. % talc (5.5 μm ave. diameter), and 6.5 wt. % coated aluminum metallized poly(ethylene terephthalate) silver glitter (0.02×0.02×0.001 cm or 0.008×0.008×0.0005 inches). The solid marking composition, upon application to ordinary notebook paper, demonstrated good, smooth laydown properties and retained the glitter in the marking composition on the marked surface. The solid marking composition, however, did not have as good cleanability characteristics as some of the other formulations.

EXAMPLE 11

A crayon utilizing a solid marking composition that comprises glitter was prepared to approximately contain 37.8 wt. % stearic acid, 8.1 wt. % stearyl alcohol, 21.6 wt. % PEG 6000 monostearate, 5.4 wt. % PEG 20M, 5.4 wt. % Kremit ®, 8.1 wt. % mica, 2.7 wt. % oleyl alcohol, 2.7 wt. % pigment (magenta), and 8.1 wt. % coated aluminum metallized poly(ethylene terephthalate) silver glitter (0.02×0.02×0.003 cm or 0.008×0.008×0.001 inches). The solid marking composition, upon application to ordinary notebook paper, demonstrated inferior properties compared to the other formulations. The composition did not laydown on a substrate, and did not retain as much of the glitter on the marked surface, as well as the other formulations.

EXAMPLE 12

Crayons utilizing a solid marking composition that comprises glitter were prepared to approximately contain 36.78 wt. % paraffin wax, 3.2 wt. % microcrystalline wax, 24.52 wt. % stearic acid, 8.0 wt. % lanolin oil, 1.6 wt. % Lipopeg ® 39S, 1.1 wt. % Renex ® 30, 0.7 wt. % Foamkill ® 614, 4.3 wt. % pigment (orange), 13.4 wt. % talc (5.5 μm ave. diameter), and 6.4 wt. % coated aluminum metallized poly(ethylene terephthalate) silver glitter (0.02×0.02×0.001 cm or 0.008×0.008×0.0005 inches). The solid marking composition, upon application to ordinary notebook paper, demonstrated good, smooth laydown properties and retained the glitter in the marking composition on the marked surface. The solid marking composition also exhibited good cleanability characteristics. The solid marking composition had a needle penetration value of 35 mm. Other similar crayons with a variety of pigments had needle penetration values ranging from 31 to 37 mm.

EXAMPLE 13

In order to demonstrate the importance of the presence of an emollient in the solid marking composition, two similar sets of crayons were prepared using a solid marking composition that differed with respect to the presence of an emollient. One set of crayons was molded from a solid marking composition prepared to approximately contain 47.2 wt. % paraffin wax, 31.5 wt. % stearic acid, 8.2 wt. % lanolin oil, 6.5 wt. % pigment (orange), and 6.6 wt. % coated aluminum metallized poly(ethylene terephthalate) silver glitter (0.02×0.02×0.001 cm or 0.008×0.008×0.0005 inches). The other set of crayons was molded from a solid marking composition prepared to approximately contain 51.8 wt. % paraffin wax, 34.6 wt. % stearic acid, 7.1 wt. % pigment (orange), and 6.5 wt. % coated aluminum metallized poly(ethylene terephthalate) silver glitter (0.02×0.02×0.001 cm or 0.008×0.008×0.0005 inches). The two sets of crayons had about the same weight ratio of paraffin wax to stearic acid, i.e., about 1.5:1 . These two sets of crayons were applied to ordinary notebook paper for comparison of their respective laydown characteristics. The crayons with the emollient had superior laydown characteristics as compared to the crayons without the emollient. The crayons with the emollient exhibited good deposition of the solid marking composition on the notebook paper and good adherence of the glitter to the substrate.

EXAMPLE 14

For comparison purposes, several glitter crayons similar to those of the Example of U.S. Patent 4,990,013 were prepared and evaluated by application to ordinary notebook paper.

Crayons were formed from a solid marking composition containing 40 wt. % paraffin wax, 5 wt. % candelilla wax, 5 wt. % carnauba wax, 49% stearic acid, and 1 wt. % coated aluminum metallized poly(ethylene terephthalate) silver glitter (0.02×0.02×0.001 cm or 0.008×0.008×0.0005 inches). These crayons duplicated the crayon set forth in the Example of the '013 patent except with respect to the type of glitter. In preparing these and the other crayons, the glitter was of the same coated aluminum metallized poly(ethylene terephthalate) variety as used in the other examples herein. These crayons exhibited very poor laydown properties, thereby resulting in little glitter being deposited and retained on the notebook paper.

In an attempt to improve the crayon of the Example of the '013 patent, another set of crayons was prepared using more glitter. These crayons were formed from a solid marking composition containing 46.4 wt. % paraffin wax, 4.7 wt. % candelilla wax, 4.7 wt. % carnauba wax, 37.8% stearic acid, and 6.4 wt. % coated aluminum metallized poly(ethylene terephthalate) silver glitter (0.02×0.02×0.001 cm or 0.008×0.008×0.0005 inches). The resulting crayons also exhibited very poor laydown properties, thereby resulting in little glitter being deposited and retained on the notebook paper.

In a further attempt to improve the crayon of the Example of the '013 patent, another set of crayons was prepared with the addition of the pigment and talc used in Example 12. These crayons were formed from a solid marking composition containing 37.6 wt. % paraffin wax, 3.8 wt. % candelilla wax, 3.8 wt. % carnauba wax, 30.7% stearic acid, 6.2 wt. % coated aluminum metallized poly(ethylene terephthalate) silver glitter (0.02×0.02×0.001 cm or 0.008×0.008×0.0005 inches), 5.1 wt. % pigment (orange), and 12.8 wt. % talc (5.5 μm ave. diameter). The resulting crayons were somewhat improved but also exhibited very poor laydown properties, thereby resulting in little glitter being deposited and retained on the notebook paper.

The hardness of these three sets of crayons was evaluated. The crayons had needle penetration values of 13-15 mm, evidencing that the crayons were much harder than the preferred crayons of the present invention.

All of the patents, patent applications, and other references cited herein are hereby incorporated in their entireties by reference.

While this invention has been described with emphasis upon a preferred embodiment, it will be obvious to those of ordinary skill in the art that the preferred composition may be varied. It is intended that the invention may be practiced otherwise than as specifically described herein. Accordingly, this invention includes all modifications encompassed within the spirit and scope of the following claims.

What is claimed is:

1. A solid marking composition comprising a plasticizer, a fatty acid, an emollient, a pigment, and glitter, such that said glitter is capable of being retained on a substrate when said composition is deposited on said substrate.

2. The solid marking composition of claim wherein said solid marking composition has a needle penetration value of about 25 to about 45 mm.

3. The solid marking composition of claim 1, wherein said plasticizer is selected from the group consisting of paraffin waxes, microcrystalline waxes, synthetic waxes, natural waxes, vegetable fats and hydrogenated and sulfonated derivatives thereof, animal fats and hydrogenated derivatives thereof, fatty esters of glycols, fatty acid salts of alkali and alkaline earth metals and aluminum, and mixtures thereof, and said fatty acid has from about 14 to about 24 carbon atoms.

4. The solid marking composition of claim 3, wherein said plasticizer is a wax having a melting point in the range of about 52° C. (125° F.) to about 82° C. (180° F.) and said fatty acid is selected from the group consisting of lauric acid, myristic acid, palmitic acid, stearic acid, and mixtures thereof.

5. The solid marking composition of claim 4, wherein said plasticizer is a paraffin wax.

6. The solid marking composition of claim 5, wherein said fatty acid is stearic acid.

7. The solid marking composition of claim 6, wherein said plasticizer is present in an amount of about 20% to about 65% by weight of the total marking composition and said fatty acid is present in an amount from about 5% to about 40% by weight of the total marking composition.

8. The solid marking composition of claim 7, wherein said glitter is present in an amount from about 3% to about 10% by weight of the total marking composition.

9. The solid marking composition of claim 8, wherein said glitter is coated aluminum metallized poly(ethylene terephthalate).

10. The solid marking composition of claim 6, wherein said emollient is selected from the group consisting of lanolin oil and its derivatives, mineral oil, fatty esters, fatty acid esters, fatty alcohols, mono- and di-esters of propylene glycols, glycerol di-esters, mono- and di-esters of polyethylene glycols, petrolatum, vegetable shortening, dimers and trimers of fatty acids, plant oils, silicones, and mixtures thereof.

11. The solid marking composition of claim wherein said emollient is selected from the group consisting of lanolin oil and its derivatives, mineral oil, plant oils, and mixtures thereof.

12. The solid marking composition of claim 11, wherein said emollient is lanolin oil.

13. The solid marking composition of claim 12, wherein said emollient is present in an amount from about 3% to about 20% by weight of the total marking composition.

14. The solid marking composition of claim 13, wherein said pigment is present in an amount from about 2% to about 15% by weight of the total marking composition.

15. The solid marking composition of claim 14, which additionally comprises a filler.

16. The solid marking composition of claim 15, wherein said filler is selected from the group consisting of calcium carbonate, talc, silica, clay, feldspar, corn starch, mica, and mixtures thereof.

17. The solid marking composition of claim 16, wherein said filler is talc.

18. The solid marking composition of claim 17, wherein said filler is present in an amount up to about 25% by weight of the total marking composition.

19. A solid marking composition comprising about 30-40 wt. % paraffin wax, about 1-5 wt. % microcrystalline wax, about 20-30 wt. % stearic acid, about 5-10 wt. % lanolin oil, about 2-10 wt. % pigment, about 10-20 wt. % talc, and about 5-10 wt. % glitter.

20. The solid marking composition of claim 19 which further comprises about 1-4 wt. % cleanability agent.

* * * * *

UNITED STATES PATENT AND TRADEMARK OFFICE
CERTIFICATE OF CORRECTION

PATENT NO. : 5,261,952
DATED : Nov. 16, 1993
INVENTOR(S) : Craig

It is certified that error appears in the above-identified patent and that said Letters Patent is hereby corrected as shown below:

In Column 2, line 41: "substrate Solid" should read --substrate. Solid--

In Column 2, line 42: "materials Tradi-" should read --materials. Tradi- --

In Column 3, line 54: "io" should be deleted.

In Column 6, line 3: "o 20" should be deleted.

In Column 8, line 46: "X0.00X00.1" should read --X0.001--

In Column 9, line 42: "Wax" should be --wax--

In Column 9, line 59: "oil, wt." Should read --oil, 1.1 wt.--

In Claim 2, Column 11, line 66: "claim wherein" should read --claim 1, wherein--

Signed and Sealed this

Fifteenth Day of December, 1998

Attest:

BRUCE LEHMAN

*Attesting Officer*  *Commissioner of Patents and Trademarks*